United States Patent
Kim et al.

(10) Patent No.: US 10,116,196 B2
(45) Date of Patent: Oct. 30, 2018

(54) PARALLEL ELASTIC MECHANISM FOR ROBOT-ENVIRONMENT FORCE INTERACTION

(71) Applicant: DISNEY ENTERPRISES, INC., Burbank, CA (US)

(72) Inventors: Joohyung Kim, Pittsburgh, PA (US); Katsu Yamane, Township of O'Hara, PA (US); Zachary Batts, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 288 days.

(21) Appl. No.: 15/141,449

(22) Filed: Apr. 28, 2016

(65) Prior Publication Data

US 2017/0317571 A1    Nov. 2, 2017

(51) Int. Cl.
| G05D 23/275 | (2006.01) |
| H02K 41/035 | (2006.01) |
| H02P 7/025 | (2016.01) |
| H02K 7/08 | (2006.01) |

(52) U.S. Cl.
CPC ......... *H02K 41/0356* (2013.01); *H02K 7/08* (2013.01); *H02P 7/025* (2016.02); *Y10S 901/01* (2013.01)

(58) Field of Classification Search
CPC ..................................................... H02P 7/025
See application file for complete search history.

(56) References Cited

U.S. PATENT DOCUMENTS

| 8,083,013 | B2 * | 12/2011 | Bewley | ................. | B62D 37/00 180/199 |
| 2002/0063481 | A1 * | 5/2002 | Fukunaga | .......... | H02K 41/0356 310/17 |

* cited by examiner

Primary Examiner — Karen Masih
(74) Attorney, Agent, or Firm — Marsh Fischmann & Breyfogle LLP; Kent A. Lembke

(57) ABSTRACT

A prismatic actuator for imparting a hopping motion to a supported load such as a leg of robot. The apparatus includes a direct drive motor, such as a voice coil, operable to provide translational motion. The apparatus includes a spring element and a prismatic guide assembly. The guide assembly is configured to support the direct drive motor to constrain the translational motion to be along a drive axis and support the spring element to constrain compression and expansion of the spring element along a longitudinal axis parallel to the drive axis. The apparatus includes a controller that: (1) first controls the direct drive motor to compress the spring element during a first time period beginning when the apparatus initially contacts a surface; and (2) second controls the direct drive motor to expand the spring element when the apparatus has zero velocity while contacting the surface.

24 Claims, 9 Drawing Sheets

PARALLEL ELASTIC MECHANISM FOR ROBOT-ENVIRONMENT FORCE INTERACTION

BACKGROUND

1. Field of the Description

The present description relates, in general, to prismatic actuators, and more particularly, to a prismatic parallel elastic mechanism for use in robot-environment interaction tasks, such as moving a support load such as a robot with a hopping motion (e.g., a translational elastic actuator used in a "hopping robot").

2. Relevant Background

Legged robots have been in wide use for many years and have many varying designs. For example, hopping robots are one type of design for legged robots or machines. Hopping robots are highly dynamic mobile platforms that have proven to be useful in many applications and environments. More recently, control and simulation of hopping robots has been simplified by representing these robots with reduced-dimensional models.

However, an ongoing challenge with the design of a hopping robot is that these robots require high speed and high force actuation due to the need to achieve non-trivial ground clearance to generate the hopping motion. In one exemplary design, a quadruped robot was constructed that could walk and also hop robustly using hydraulic actuators. Other designs have been proposed and researched that have achieved hopping motions with monopod, biped, and quadruped robots using electrical motors.

Untethered, hydraulically-actuated hopping robots can often outperform their electrical motor counterparts, but such hopping robots cause safety concerns for broader use outside the research environment and also present added design constraints. Hydraulic actuators in a robot system are powered by a compressor, which is typically large and heavy and which is most often placed on the body of the robot making the whole robot heavier than desired and bulky to implement. Further, compressors may operate at high pressures, be fueled by flammable liquids, and drive very large actuator forces. Each of these operating characteristics of a compressor poses safety hazards to human operators, especially during legged locomotion where collisions (wanted or unwanted) can be ubiquitous.

Some legged (but non-hopping) robots have also been designed that employ series elastic actuators (SEAs) to drive their rotary joints. By introducing compliance between the actuator and the robot linkage, an SEA is capable of storing energy and absorbing impacts between the robot and the environment. On the other hand, parallel elastic actuators (PEAs) can reduce power consumption and increase the net force or torque of the actuator during legged locomotion. Despite these advantages, few prismatic (translational motion) PEAs have been implemented due, in part, to the difficulties in converting the rotary motion of a typical electric motor to linear movement, which can introduce unacceptable friction, hysteresis due to gearing backlash, and non-linear force output.

Hence, there remains a need for an improved design for a hopping robot actuator mechanism. Particularly, there is a growing need for a prismatic actuator that can be used to replace the effective but very bulky and, in some cases, unsafe hydraulic actuators presently in use in many hopping robots.

SUMMARY

Briefly, the inventors recognized that a type of direct-drive linear motor, such as a voice coil motor, voice coil actuator, or, more simply, a voice coil, may offer a useful alternative to the use of hydraulic linear actuators and also to the use of geared electric rotary motors. A voice coil motor is a prismatic (e.g., prismatic meaning a voice coil motor provides translational or linear motion) electric actuator that has negligible friction, no gearing, and a linear force output (e.g., a force that is proportional to current, relatively constant over its displacement, and lacking hysteresis due to backlash play and friction). Additionally, voice coils are electric and, therefore, avoid the issues with hydraulic actuators including bulky and noisy pumps/compressors and maintenance issues such as oil leaks.

To make use of a voice coil motor, a compact and lightweight prismatic or translational actuator mechanism was created by the inventors that uses a parallel elastic design with a voice coil, which has particular use and application for a standalone (energetically autonomous and/or "untethered") hopping robot. The actuator may be considered a linear elastic actuator in parallel or "LEAP" that combines a voice coil motor in parallel with one or more compression springs, and the LEAP may be used in a hopping mechanism, which can be used to provide a hopping motion to a robot or other load (e.g., be provided in a leg of a robot to provide a hopping robot). The term "linear" in the LEAP acronym refers to prismatic or translational motion as well as a proportional relation between current and voice coil force, a proportional relation between spring force and displacement, and constant relation between voice coil force and displacement. With this in mind, the labels LEAP and prismatic (or translational) elastic mechanism may be used interchangeably in this description.

There are several key ideas that allowed the inventors to move toward development of a hopping mechanism using a prismatic actuator (e.g., a LEAP or a parallel elastic mechanism with a voice coil). First, the prismatic actuator had to be designed to produce linear sliding movement with compliance. One embodiment of a prismatic actuator was designed as a LEAP that included a voice coil motor and one or more springs. A linear guide assembly (or linear bearing assembly) was provided to ensure that the coil element and body of the voice coil motor move along a central axis relative to each other and the spring(s) moves linearly and parallel to the voice coil motor. This may be achieved with linear or translational guides extending parallel to the central axis of the voice coil motor, with each of the springs being positioned over one of the linear guides to support the spring(s) and define its linear motion path.

Second, the inventors designed the hopping mechanism so that it is compact and light enough in weight to be useful as part of a leg of a robot that can hop by itself with onboard power (or offboard power in some applications), and a hopping mechanism for a one-legged robot was prototyped and tested. Third, a circuit and mechanical models were derived for simulation and control of the hopping mechanism. In one example, design parameters for a LEAP were found by using a circuit model including voice coil dynamics and a mechanical model including a compression spring in parallel to the voice coil. Fourth, a spring stiffness was determined for a LEAP that maximized the height of hopping (with a simple bang-bang controller used for optimization). The combination of these ideas allowed the inventors to design a hopping mechanism with many benefits and likely uses. The parallel elastic design allowed the use of relatively lightweight actuators (relative to hydraulic and other prior hopping actuator designs) to achieve an amount of hopping motion because the active component (e.g., the actuator) does not have to support the force produced by the passive component (e.g., a spring in this new design).

More particularly, an actuator or apparatus is provided for producing relative motion between a supported load such as a leg of a robot, a robot torso, or other structure and its environment. The apparatus includes a direct drive motor operable to provide translational motion. The apparatus includes a spring element and a prismatic guide assembly. The prismatic guide assembly is configured to first support the direct drive to constrain the translational motion to be along a drive axis and to second support the spring element to constrain compression and expansion of the spring element along a longitudinal axis that is parallel to and offset from the drive axis of the direct drive. In some implementations, the apparatus further includes a controller that operates to: (1) first control the direct drive motor to compress the spring element during a first time period beginning when the apparatus is sensed to initially contact a surface; and (2) second control the direct drive to expand the spring element during a second time period beginning when the apparatus is sensed to have zero velocity while contacting the surface.

In some preferred embodiments, the direct drive motor comprises a voice coil motor (or voice coil or VCM). In such cases, the body of the VCM and the coil are supported so as to move with their central, longitudinal axes coinciding and without contacting each other during the translational motion. To this end, the prismatic guide assembly may include: (a) a coil support supporting a coil element of the voice coil motor; (b) a body support spaced apart from the coil support and supporting a body of the voice coil motor; and (c) a bearing assembly (e.g., a translational bearing assembly such as a linear bearing assembly) constraining relative movement between the coil and body supports to be parallel to the drive axis. The bearing assembly may, in some implementations, include first and second guide shafts (e.g., cylindrical metal rods or tubes) extending between the coil support and the body support so as to be parallel to each and to be positioned on opposite sides of the voice coil motor.

The spring element may include a compression spring coiled about exterior surfaces of one of the first and second guide shafts. In such cases, the spring element may also include an additional compression spring coiled about exterior surfaces of another one of the first and second guide shafts (e.g., include two or more springs). The guide assembly further may include first and second linear bearings in one of the body support and the coil support for receiving portions of the first and second guide shafts, respectively, during relevant movement of the body and coil supports cause by the translational motion of the voice coil motor. The inventors also recognized and verified that maximizing the amount of hop or jump when combining a VCM with a spring element may be achieved by providing the spring element with an optimal stiffness, which can be estimated in simulation.

DETAILED DESCRIPTION

Briefly, the following description discusses the design of a hopping mechanism or apparatus that is useful to provide a hopping motion to a load such as a robot leg or to a frame/structure supported on or attached to the hopping mechanism. The hopping mechanism provides a variety of advantages including being lightweight and compact in size that allows it to be used in robotic and other applications in place of hydraulic and other more bulky actuators.

The following description begins with a higher level or more general description of a hopping mechanism designed by the inventors. The description then presents a specific example or embodiment of a useful prismatic or translational actuator (or linear elastic actuator in parallel ("LEAP")) for use in hopping mechanisms (again, the term "linear" in the LEAP acronym refers to prismatic or translational motion as well as a proportional relation between current and voice coil force, a proportional relation between spring force and displacement, and constant relation between voice coil force and displacement such that LEAP and parallel elastic mechanism may be used interchangeably). Next, an electromechanical model of a LEAP is presented along with one useful controller (or control program) that maximizes energy injection. A simulation of the hopper mechanism or "hopper" is explained with a range of spring parameters. The description then details a physical implementation of the prototyped LEAP. This is followed by a discussion of the behavior of the physical system through a series of experiments conducted by the inventors, which verifies there is a linear relationship between input current and output force, identifies the stiction force of a designed prismatic joint, and presents hopping data for the prototyped hopping mechanism with the LEAP at several spring constants. Finally, the description includes a discussion of the experimental results obtained with the prototyped hopping mechanism.

Figure 1:
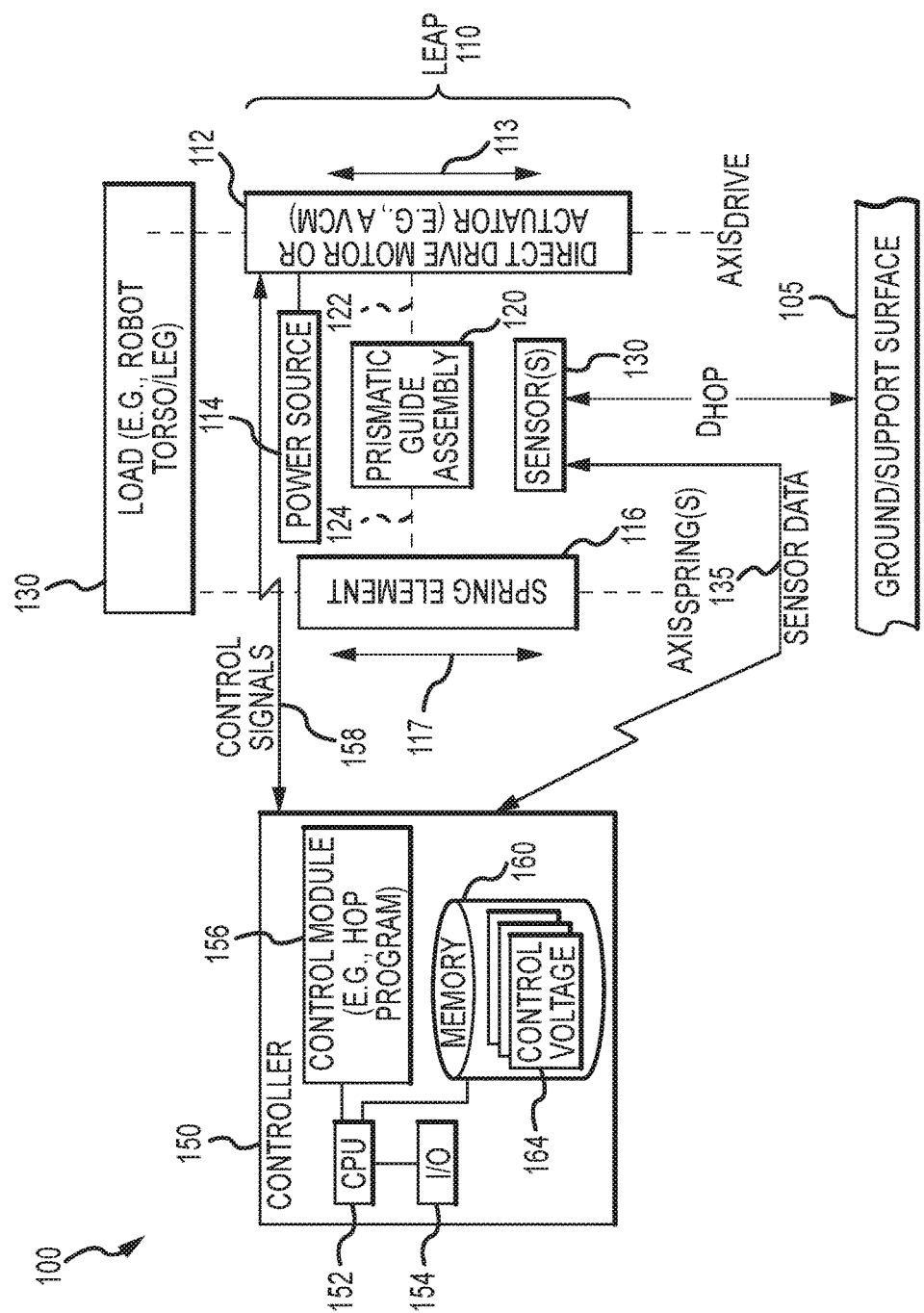
FIG. 1 is a schematic or functional block drawing of a hopping mechanism or apparatus of the present description.

FIG. 1 illustrates a functional block or schematic diagram of a hopping mechanism or apparatus 100 of the present description. During operations, the hopping mechanism 100 is useful for providing a hopping motion of a load (such as portions of a robot (such as a leg and interconnected torso or frame elements) or other structures) 130 relative to the ground or other support surface 105. These hopping motions provide a clearance, $D_{Hop}$, between the hopping mechanism 100 and the support surface 105, which lifts the load 130 into the air above the surface 105 in a repeated manner that can be used to move the load 130 about a space (with the clearance, $D_{Hop}$, typically measured between the lowest feature of the hopping mechanism 100 such as a lower or bottom portion of a linear guide assembly 120, which may have an elastic pad or foot (not shown in FIG. 1) affixed to it (see FIG. 2)).

To achieve the hopping motion, the hopping mechanism 100 includes a prismatic/translational actuator or linear elastic actuator in parallel (or LEAP) 110. The LEAP 110 includes a direct drive actuator (or prismatic direct drive with "direct" intended to mean without gears or a gear box). The direct drive actuator 112 may be electric, and a power source 114 (which may be onboard or offboard relative to the LEAP 110) such as one or more batteries. A prismatic or translational guide assembly 120 is coupled as shown with dashed line 122 to the direct drive motor 112 to support the direct drive motor 112 in the LEAP 110 so as to constrain its movements 113 to be along a longitudinal axis, $Axis_{Drive}$ (e.g., along an axis that is generally vertical or perpendicular to the support surface 105).

The direct drive motor (or prismatic actuator) 110 is chosen to be very fast (or high speed) in its action or moving 113 through its stroke, to move 113 with little friction, and, typically, to be relatively lightweight. The inventors determined that a voice coil or voice coil motor (VCM) may be very desirable for use as the direct drive motor 112 in a LEAP 110. A VCM is a type of direct drive linear motor that offers an excellent alternative to a geared electric rotary motor (as used in many SEAs). A VCM is a prismatic electric actuator that has negligible friction, no gearing, and a linear force output as it moves 113 (the coil element and body move relative to each other) along the longitudinal axis, $Axis_{Drive}$.

Figure 6:
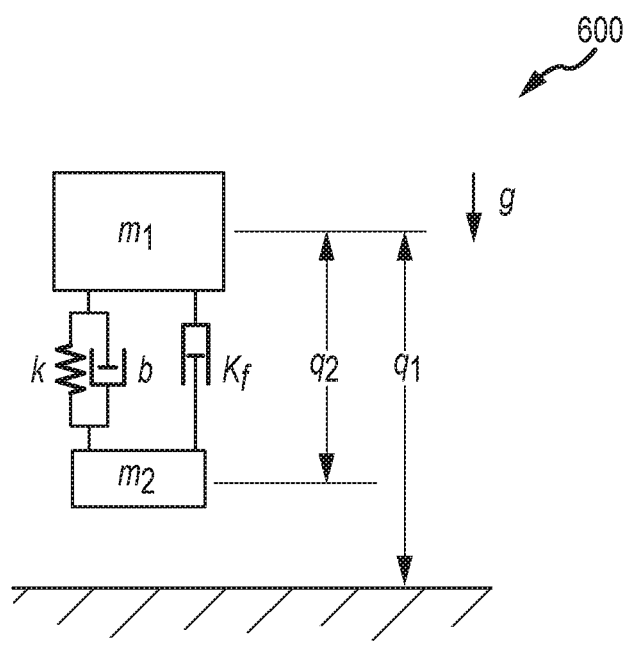
FIG. 6 illustrates a mechanical model of a hopping mechanism of the present description.

The LEAP 110 is elastic in that it also includes an elastic element 116, which may be a spring element (e.g., one, two, or more compression springs and/or extension springs) or take another form such as one or more compressed air cylinders. The LEAP 110 is "in parallel" as the prismatic guide assembly 120 is coupled/interconnected as shown with dashed line 124 with the spring element 116 to guide or constrain the compression/expansion 117 of the spring element to be along a longitudinal axis (or axes of each spring that may be provided as the spring element 116), $Axis_{spring(s)}$, which is parallel (e.g., within about 5 degrees of true parallel) to the longitudinal axis, $Axis_{Drive}$, of the linear direct drive motor 112. In this way, the direct drive motor 112 can have its movements 113 timed or synchronized with the hopping motion to effectively impart energy into the spring element 116 to increase the hopping distance or clearances, $D_{Hop}$, achieved with the hopping mechanism 100 (as explained in more detail below). Furthermore, the LEAP 110 is "in parallel" because the spring and actuator element, as shown in FIG. 6, are topologically in parallel and are effected by the same displacement.

The hopping mechanism 100 further includes a controller 150 (which, as with the power source 114, may be onboard or offboard of the LEAP 110 (e.g., mounted within the linear guide assembly 120 if onboard or the like)). The controller 150 may be computer or computing device (e.g., a circuit board) with a processor 152 managing input/output devices (I/O devices) 154. The I/O devices 154 may allow a human operator to enter input to program the controller 150 and/or to select a hopping program 156 to be executed by the controller 150. The I/O devices 154 may further includes communication devices such as wired or wireless transceivers for communicating with the LEAP 110 (e.g., to transmit wired or wireless control signals 158 to the drive 112 and to receive sensor data communications 135 from one or more sensors 130 on the LEAP 110).

The processor 152 executes a set of instructions or code (or software) to provide a control module (or hop program) 156. The processor 152 also manages operations (store and retrieve) of a memory device(s) 160. The control module 156 may function to selectively generate control signals 158 to the direct drive motor 112 (or its driver that uses the power source 114 to energize the motor 112 to provide the movement 113). These control signals 158 may be generated in response to sensor data 135 received from one or more sensors 130 on the LEAP 110, which may be used to determine the amount of movement 113 of the drive motor 112 (e.g., how much a coil of a VCM has moved relative to the body of the VCM or the like) and/or to determine when the LEAP 110 is in contact with the surface 105, and/or to determine a present velocity of one or more components of the LEAP 110. This sensor data 135 can be processed by the control module 156 to time the control signals 158 to better inject energy into the spring element 116 to assist/increase the movement 117 and, hence, the clearance or hop height, $D_{Hop}$, achieved by the hopping mechanism 100. The memory 160 may store a set of control voltages 164 that can be used to generate the control signals 158 and operate the direct drive motor 112 by applying power from the source 114 during particular operating states of the LEAP 110 (as is explained in detail below).

The above example discusses linear movements/motions as shown with arrow 113, but the mechanism 100 may also be configured or modified to include rotational parallel elastic mechanisms through reconfiguration of the guide assembly 120, the elastic element 116, and the direct drive motor 112 such that motions 113 and 117 follow a circular or rotational path about a center axis rather than a linear axis (e.g., with the rotational movements taking place in parallel planes). To this end, the direct drive motor 112 may take the form of one or more rotational voice coils. Hence, it will be clear that the inventors' concepts are not limited to hopping only but are useful in providing/controlling other robot-environment force and torque interactions. Further, the control module 156 may take the form of a bang-bang controller as discussed above or it may take many other forms such as a force-impedance controlled actuator (which is a variation of the bang-bang controller) or other control algorithm/process.

Figure 2:
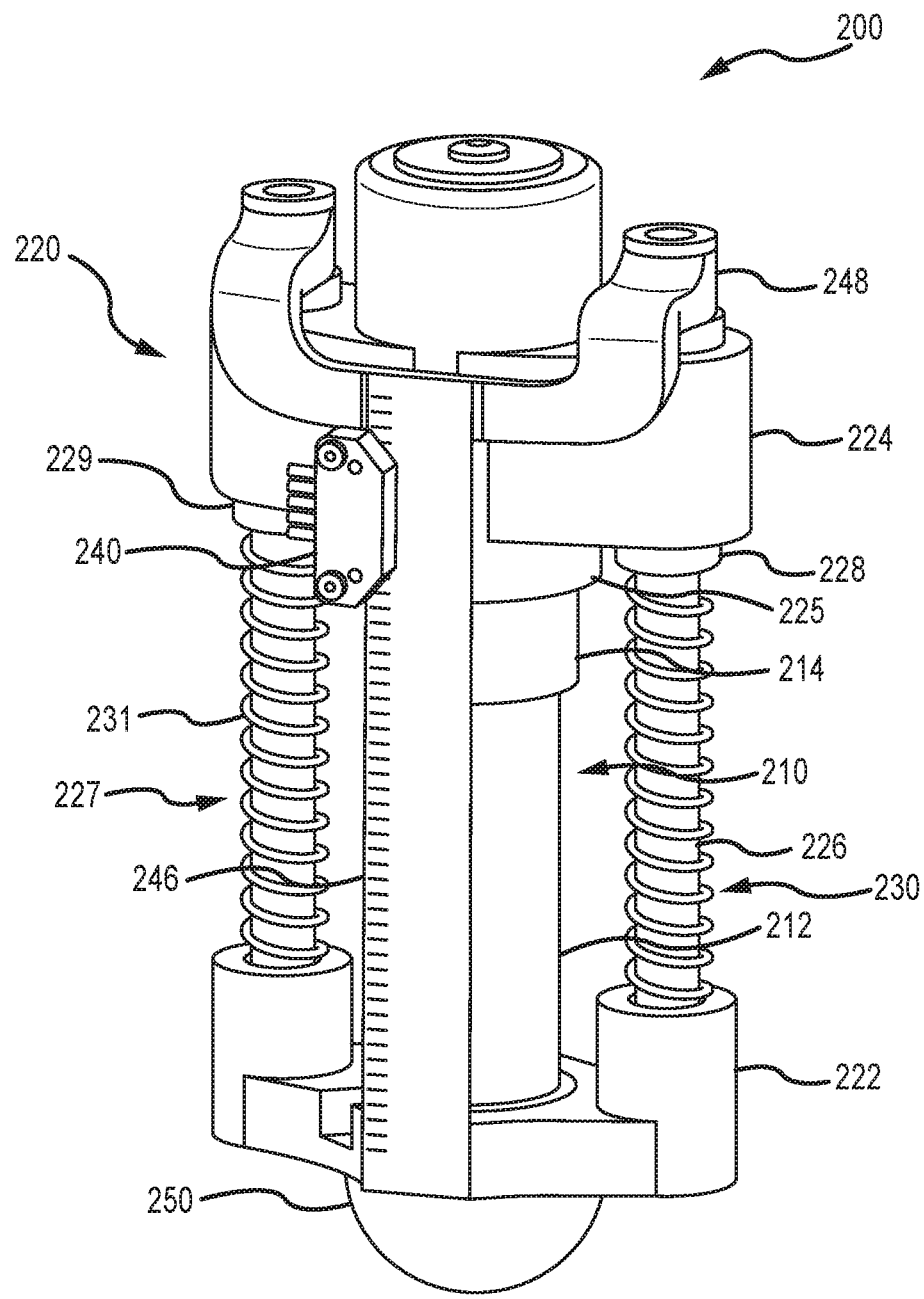
FIG. 2 illustrates an axonometric view of portions of an exemplary hopping mechanism utilizing a LEAP with a voice coil motor combined with compression springs in parallel.

The hopping mechanism may be implemented with a variety of spring elements, direct drive motors or actuators (e.g., a linear direct drive motor), and other components to achieve the functionality described herein. FIG. 2 illustrates one embodiment of a hopping mechanism 200 that provides a useful linear elastic actuator in parallel (LEAP) or parallel elastic mechanism, which places a voice coil actuator (or VCM) 210 in parallel with one or more springs (with two springs 230, 231 shown in FIG. 2) that can be operated to drive a small scale hopping robot or in another hopping device. The inventors chose a parallel configuration to offload the force requirements of the mechanism to the springs 230, 231 and to allow the voice coil motor 210 to inject energy directly into the springs 230, 231 (which may be thought of as acting in combination as the spring element 116 of FIG. 1 with a single spring constant).

As shown, the hopping mechanism 200 provides a LEAP by combining a VCM 210 with a spring element in the form of a pair of springs 230, 231. Particularly, the VCM 210 includes a coil or coil element 212 and a body 214, and a prismatic guide assembly 220 is provided to constrain the relative movements of the coil element 212 and body 214 to both be along a central longitudinal axis (e.g., the center axis of the hopping mechanism 200 in this example) without contacting each other (e.g., without rubbing or minimal friction relative to each other). To this end, the guide assembly 220 includes a coil support or housing 222 to which a first or lower end of the coil element 212 is rigidly attached and a body support or housing 224 to which a first or upper end of the body 214 is rigidly attached (e.g., via a body restraint or collar 225 extending outward from a lower surface of the body support or housing 224).

To guide/restrain the springs 230, 231 to have longitudinal axes parallel to the VCM 210, the prismatic guide assembly 220 further includes a pair of guide shafts (e.g., metal or plastic shafts with circular aluminum rods or shafts used in one embodiment with outer diameters being a small amount smaller than the inner diameter of the springs 230, 231 in an anticipated most expanded or stretched state) 226, 227. Translational (or linear, in some cases) bearings 228, 229 (which are chosen to limit friction) are provided in the body support or housing 224 to slidingly engage/support upper ends of the guide shafts 226, 227 and to allow the guide shafts 226, 227 to move a distance into the body support or housing 224 during the hopping motion of the mechanism 200 as the springs 230, 231 compress and expand in length (and the coil element 212 and body 214 move relative to each other). The other or lower ends of the guide shafts 226, 227 are attached/fixed to the coil support or housing 222, with the longitudinal axes of the guide shafts 226, 227 being parallel to the longitudinal axis of the VCM 210 (or to the center axes of the coil element 212 and body 214, which coincide in the hopping mechanism 200).

The hopping mechanism 200 provides a prismatic joint using two shaft-bearing pairs. Compression springs 230, 231 coil around each guide shaft 226, 227 and act in parallel to the voice coil 210, with the guide shafts 226, 227 and springs 230, 231 being positioned to be spaced apart from the outer surfaces of the voice coil 210 and on opposite sides (e.g., at 180 degree offsets about the circumference of the voice coil 210). The hopping mechanism 200 further includes a sensor for determining how far the coil element 212 has moved relative to the body 214. To this end, an incremental encoder 240 is provided (mounted on the body housing 224) that measures the relative displacement or "stroke" of the coil 212 and body 214. A code strip 246 is mounted at a first end to the body housing 224 via a code strip holder 248 and a second end to the coil housing 222, and the encoder 240 provides its output (sensor data) to a controller (not shown but may take the form of controller 150 of FIG. 1) for processing and, in response, generating control signals to the voice coil 210.

Figure 3:
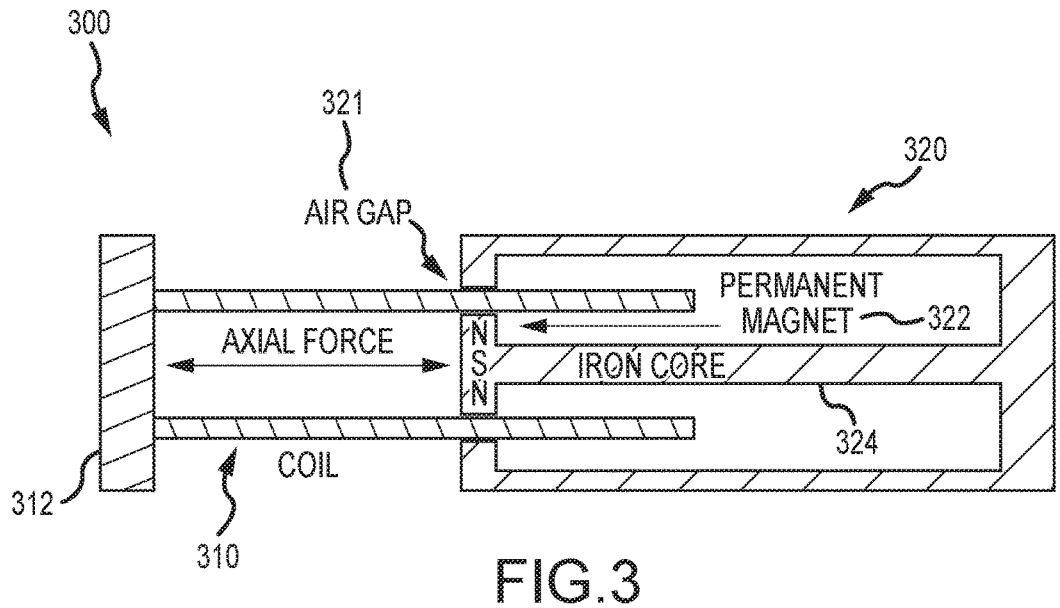
FIG. 3 is cross-sectional view of a cylindrical voice coil motor or assembly.

At this point in the description, it may be useful to discuss a useful circuit model for voice coil dynamics to further the understanding of how to design a controller and simulate operations of a hopping mechanism proposed by the inventors. FIG. 3 illustrates a cross-sectional view of a cylindrical voice coil assembly or motor 300 that is useful for understanding exemplary physical structure. As shown, the voice coil assembly 300 includes a coil or coil element 310 extending from an end cap or hub 312 (which in FIG. 2 would be affixed to the coil support or housing 222). The assembly 300 further includes a body 320 with an inner void for receiving an end of the coil element 310 (end opposite the end affixed to the cap/hub 312). The body 320 includes a permanent magnet 322 centrally positioned at the end of the housing 320 with a gap/hole 321 for receiving the coil element 310. An iron core 324 extends along the center line/axis of the housing 320. In this way, the permanent magnet 322 and iron core 324 are both positioned within the center void or enclosed volume of the cylindrical coil element 310. During operations of the assembly 300, an axial force is generated that causes the coil element 310 and its end cap/hub 312 to move back and forth linearly relative to the body 330 (e.g., linear actuation along a center axis of the coil 310 and body 320).

The cross-sectional view of the voice coil assembly 300 of FIG. 3 reveals the iron core 324 that concentrates magnetic flux across the coil 310. As current is passed through the coil 310, a force (shown by the arrow labeled "Axial Force" in FIG. 3) develops between the iron core 324 and the coil 310 along their mutual center longitudinal axes. The voice coil assembly 300 is an electric actuator that exerts force along its center axis that is proportional to the current passing through its coil 310. The assembly 300 includes two main components: the body 320 and the coil 310. These translate relative to each other along their mutual center axes, without making physical contact with each other. The body 320 includes a permanent magnet 322 and an iron core 324 that concentrates magnetic flux radially through the coil 310 perpendicular to its current flow.

Figure 4:
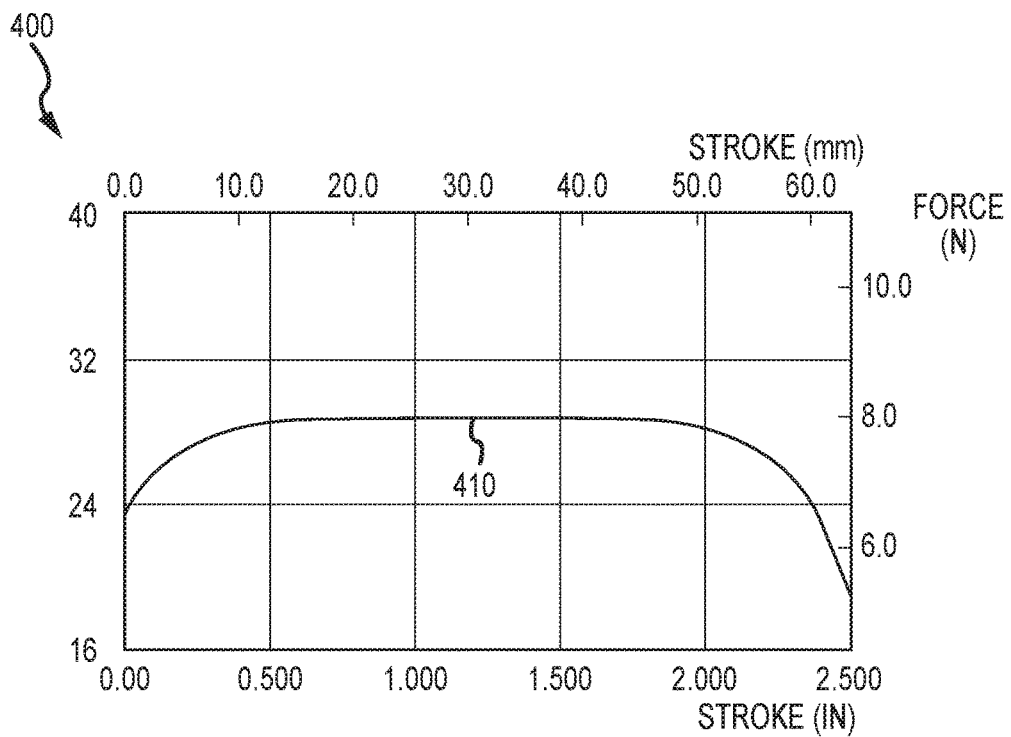
FIG. 4 is a graph showing the force-stroke relation for a representative voice coil motor or assembly.

A magnetic Lorentz force, F, is developed between the body 320 and coil 310 that is proportional to the current, I, through the coil 310, the magnetic flux density, the number of windings, and length of the conductor. This relationship can be condensed to:

$$F = K_f I \qquad \text{Eq. (1)}$$

where $K_f$ is the force constant that is dependent on the relative displacement of the body 320 and coil 310, called the stroke. FIG. 4 illustrates a graph 400 showing this relationship with line 410 for one exemplary voice coil assembly 300, at constant current and zero stroke velocity.

Figure 5:
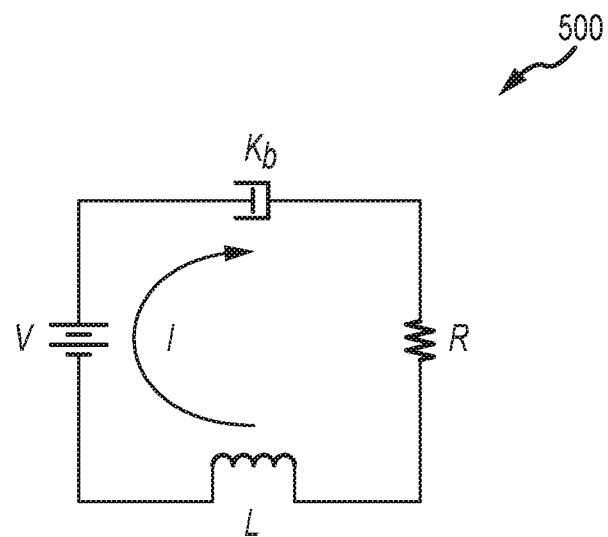
FIG. 5 is an electric circuit diagram of a voice coil.

FIGS. 5 and 6 provide electromechanical model diagrams useful for modeling voice coil dynamics with FIG. 5 showing a circuit diagram 500 of a voice coil and FIG. 6 providing a mechanical model 600 of a hopping mechanism. The voice coil circuit 500 includes a voltage supply V, back-EMF $K_b$ provided by a velocity-dependent electromotive force (back-EMF) element) resistance R and inductance L in series, and with current I. As shown, a voice coil circuit 500 can be modeled as a single loop with the components in series. The back-EMF voltage drop is proportional to the stroke velocity. The differential equation governing the electrical dynamics is:

$$V - IR - \frac{dI}{dt}L - K_b \frac{dq_2}{dt} = 0 \qquad \text{Eq. (2)}$$

where $q_2$ is the stroke. $K_b$ has the same dimensions as $K_f$ (in SI units, $K_f = K_b$). Note that the dynamics equations of a voice coil are analogous to a DC rotary motor except that they describe translational motion. Assuming a zero stroke velocity, the relation between current and voltage is first order in time, with an RL time constant, $$\tau = \frac{L}{R}.$$

FIG. 6 shows a two degree-of-freedom mechanical model 600 of a parallel elastic actuator of the present description. The model 600 includes torso mass $m_1$ with height $q_1$, a voice coil with stroke $q_2$ and force constant $K_f$, a parallel spring with elasticity k and damping b, a foot mass $m_2$ (e.g., a lower housing/support provided in a linear guide assembly with or without an elastic pad or foot on its lower surface), and gravity g. The mechanism 600 includes an elastic element in parallel with a voice coil and serves the weight-bearing functions of a leg in some robot-based implementations of the hopping mechanism.

Namely it can produce forces greater than body weight (the load), can produce forces with zero power consumption, can act compliantly or rigidly, and can store and dissipated mechanical energy. On its own, a voice coil could not achieve all of these functions. The parallel elastic element or mechanism reduces the force and power requirements of the voice coil, can store energy, and adds passive compliance to the mechanism. The parallel configuration was chosen such that the forces in the elastic element and actuator (e.g., the voice coil) are additive. Compared to a series elastic actuator (SEA), a parallel elastic actuator or mechanism (PEA or "LEAP" as labeled herein) can achieve larger forces and can inject energy into the spring during both compression and extension. Both of these qualities are desirable to maximize hopping height.

A PEA or the LEAP can also be implemented in a shorter length than an SEA, which means it can have less inertia as a swing leg, and is easier to include in a robot design. A voice coil was utilized as the prismatic actuator or direct drive actuator or motor, in part, because it has negligible internal friction (the body and the coil do not make physical contact), has no gearing, has low moving inertia (e.g., is a lightweight coil), and has high force bandwidth. These traits mean it can generate net positive work at high speeds and accelerations that are typical during hopping, while passively adding little inertia and friction to the hopping mechanism.

The equations of motion for the mechanical model 600 can be derived as:

$$m_1 \ddot{q}_1 = k(l_0 - q_2) - b\dot{q}_2 + K_f I - m_1 g \qquad \text{Eq. (3)}$$

$$m_2(\ddot{q}_1 - \ddot{q}_2) = k(q_2 - l_0) + b\dot{q}_2 - K_f I - m_2 g - F_y \qquad \text{Eq. (4)}$$

where $m_1$ and $m_2$ are the lump masses of the robot torso and foot, respectively, g is the acceleration of gravity, k and b are the spring elastic and damping constants, respectively, $l_0$ is the spring rest length, $q_1$ and $q_2$ are the generalized coordinates (torso height and voice coil stroke), and $F_y$ is the vertical ground reaction force that can be stated as:

$$F_y = -k_g y \left(1 - \frac{\dot{y}}{v_{max}}\right)\left[\frac{\dot{y}}{v_{max}} < 1\right][y < 0] \qquad \text{Eq. (5)}$$

where $k_g$ is the ground stiffness, $y = q_1 - q_2$ is the foot height, $v_{max} > 0$ is the maximum ground relaxation speed, and the [*] operator evaluates to a binary 0 or 1. This nonlinear ground reaction model captures the properties of an inelastic collision ($v_{max} \to 0$ describes perfectly inelastic collisions with infinite damping and $v_{max} = \infty$ describes perfectly elastic conditions). The same contact model may be used to capture mechanical limit collisions at the maximum or minimum stroke (not shown in Equations (3) and (4)).

At this point, it may be useful to describe one configuration for a controller of a hopping mechanism by providing a simple control strategy for a control program (e.g., module 156 of controller 150 in FIG. 1) that is designed so as to maximize actuator work. Particularly, to maximize hopping height of a hopping mechanism configured as described herein (e.g., with a LEAP), the voice coil can be operated by the controller so as to inject maximal energy into the spring(s) during one hopping cycle. To maximize actuator work, a simple bang-bang controller may be used that commands (with a control signal) zero voltage during flight (when the foot or bottom portion of the linear guide assembly is off the ground/support surface), commands maximum negative voltage during compression of the spring(s), and commands maximum positive voltage during extension of the spring(s).

It can be assumed that the hopping mechanism is in flight if the stroke exceeds a threshold value, $q_2 > q_2^{thresh}$. Similarly, the foot can be assumed to be in contact with the ground if $q_2 \leq q_2^{thresh}$, where is non-zero spring deflection. With these assumptions, the control program/algorithm may command voltage to the voice coil motor as:

$$V = \begin{cases} 0 & \text{if } q_2 > q_2^{thresh} \\ -V_{max} & \text{else if } \dot{q}_2 < 0 \\ V_{max} & \text{else if } \dot{q}_2 \geq 0 \end{cases} \qquad (6)$$

where $V_{max}$ is the maximum supply voltage. In some control programs/algorithms, the spring is not pre-compressed during flight so as to avoid exceeding the power limit of the voice coil. Since the RL time constant $$\left(\tau = \frac{L}{R}\right)$$

for the voice con used by the inventors during prototyping/testing is much smaller than the approximate spring-mass hoping period $$\left(T = \sqrt{\frac{m_1}{k}}\right),$$

the controller was configured to assume that voltage, current, and force are proportional at any stroke velocity and to further assume that commanding maximum voltage is equivalent to commanding maximum force.

The hopping mechanism or system was simulated continuously (the controller is assumed continuous) with a variable time-step solver (ode15s, relative error tolerance: 1e-4, absolute error tolerance 1e-5) using Matlab Simulink/SimMechanics/Simscape software. To determine an optimal spring stiffness that maximizes or at least enhances hopping height, the hopping mechanism or system was simulated with a range of stiffnesses assuming a range of damping coefficients (0%, 5%, and 10% critical damping). The simulation parameters and initial conditions can be seen in Table I and are equal to the measured parameters of the inventors' physical implementation or prototype.

TABLE I

Simulation Model Parameters and Initial Conditions

| Parameter | Value | Units |
|---|---|---|
| $m_1$ | 1.145 | kg |
| $m_2$ | 0.313 | kg |

TABLE I-continued

Simulation Model Parameters and Initial Conditions

| Parameter | Value | Units |
|---|---|---|
| g | 9.81 | m/s$^2$ |
| $k_g$ | 14300 | N/m |
| $v_{max}$ | 0.01 | m/s |
| $q_1(t = 0)$ | 0.1635 | m |
| $q_2(t = 0)$ | 0.00635 | m |
| min($q_2$) | 0 | m |
| R | 10 | Ω |
| L | 3.2 | mH |
| $K_f$ | 5 | N/A |
| $K_b$ | 5 | V/m/s |
| $V_{max}$ | 22.25 | V |
| $l_0$ | 0.0635 | m |
| max($q_2$) | 0.0635 | m |
| $q_2^{thresh}$ | 0.0585 | m |

Figure 7:
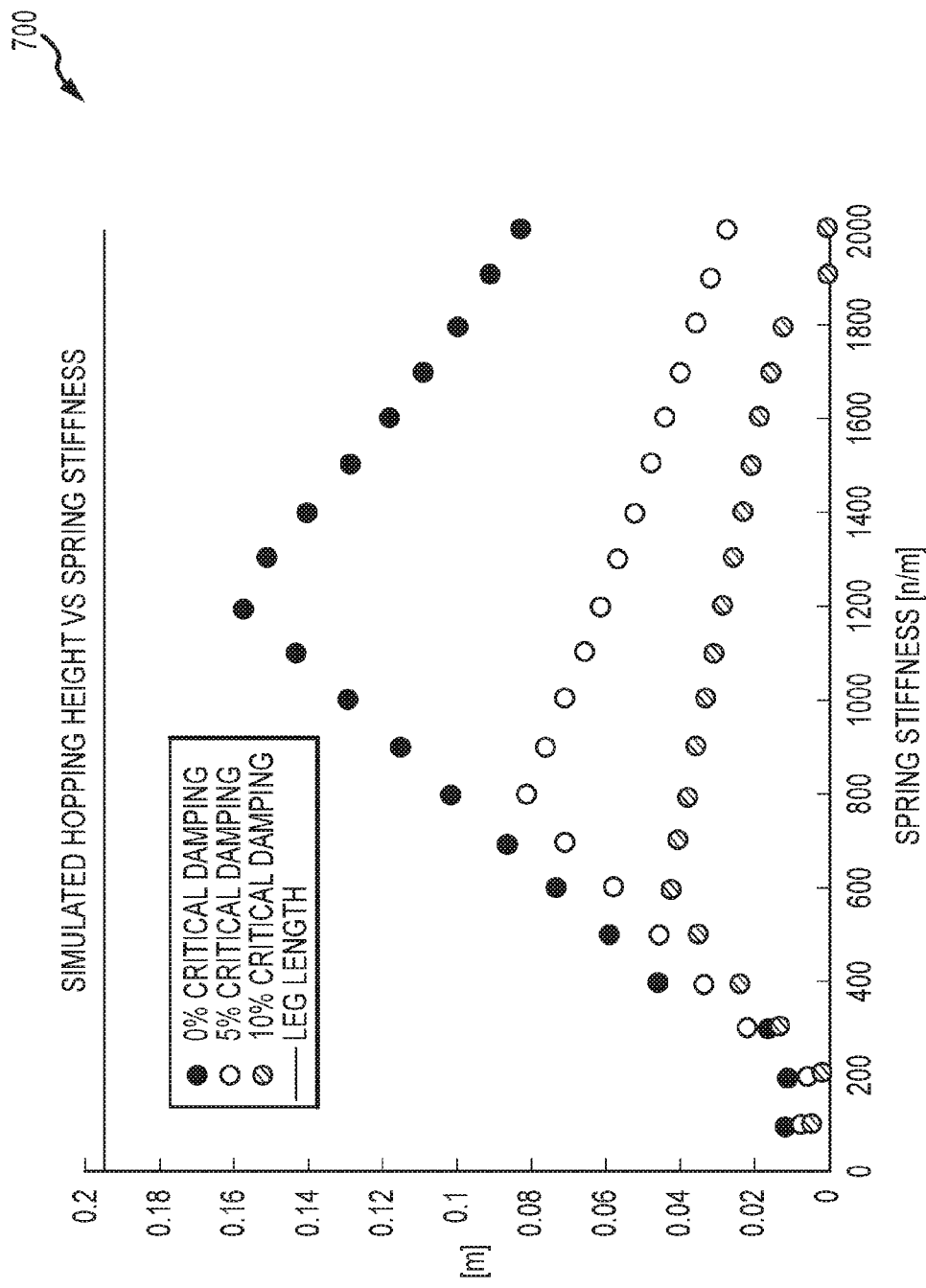
FIG. 7 illustrates graph providing results of simulating hopping height versus spring stiffness.

The force-stroke dependence is given in the graph 400 of FIG. 4 with line 410. This relationship can be approximated as a piecewise function with 10 equally-spaced nodes. For example, the hopping mechanism or system can be simulated for 10 seconds for each trial, with zero initial velocity, and 0.1 meter initial foot height. The resulting steady-state hopping heights (average ground clearance) are given in the graph 700 of FIG. 7.

The hopping mechanism 200 shown in FIG. 2 was prototyped/implemented by the inventors to verify the efficacy of their concepts. This hopping mechanism centers around a voice coil motor, which is readily available as an off-the-shelf component. The inventors assumed an approximate desired mass, length, and nominal force for their prototype LEAP, and, with these parameters in mind, the inventors surveyed multiple voice coil manufacturers and selected a model roughly by maximizing work density and stroke while minimizing price. Others may use different parameters and purchasing criteria to fabricate a hopping mechanism as taught herein. The parameters of the voice coil used in the prototype hopping mechanism are provided in Table I.

The hopping mechanism includes a torso and a foot assembly (e.g., the body and coil housings or structure attached to these housings), which translate relative to each other via linear bearings and a pair of aluminum guide shafts. Compression springs coil around each shaft and act in parallel to each other and to the voice coil. An incremental encoder (e.g., 4724 counts per meter before quadrature) was included to measure the stroke of the voice coil. A rubber foot pad was included to dampen collisions with the ground. The coil housing, the body housing, and the code strip holder for the prototype were manufactured on a 3D printer. The springs were purchased from stock and had a stiffness that roughly spanned the range of the inventors' simulated results.

The prototyped hopping mechanism was designed for a number of practical applications or uses, with one being on an untethered robot. To this end, the controller was implemented using embedded electronics, and the power source for the controller (or logic circuit) and the voice coil driver was provided with lightweight (e.g., approximately 210 grams total) lithium-polymer batteries. The controller/control circuit was implemented with a microcontroller (Parallax Propeller P8X32A), a voice coil voltage driver (Moticont 800 series), a current sensor (Allegro ACS712) to estimate voice coil force, and an ADC chip (Texas Instruments ADS1015) to read the current sensor. A linear incremental optical encoder (US Digital EM1-0-120-N) and a rotary incremental optical encoder (US Digital E2-32-250-NE-H-D-B) were used to give full state estimation (i.e., $q_1$ and $q_2$ in FIG. 6) and were read directly from the microcontroller. The sensor and control loop were run a 1 kHz, while data was output to a desktop computer at approximately 850 Hz (e.g., as fast as possible over a serial connection).

Three experiments were performed to identify system parameters and validate the electromechanical model described above. First, the current sensor, the ADC, and the voice coil were calibrated to verify a linear relationship between voice coil force and measured current. Second, the breakaway stiction force was identified for the linear bearings using a horizontal experimental setup to ensure that it is small compared to spring and voice coil force. Third, the hopping mechanism was tested with different spring stiffnesses. Through these tests, the relevant system parameters were identified, and the tests show that the original model captured the general behavior of the physical hopping mechanism (i.e., the prototype shown in FIG. 2).

Figure 8:
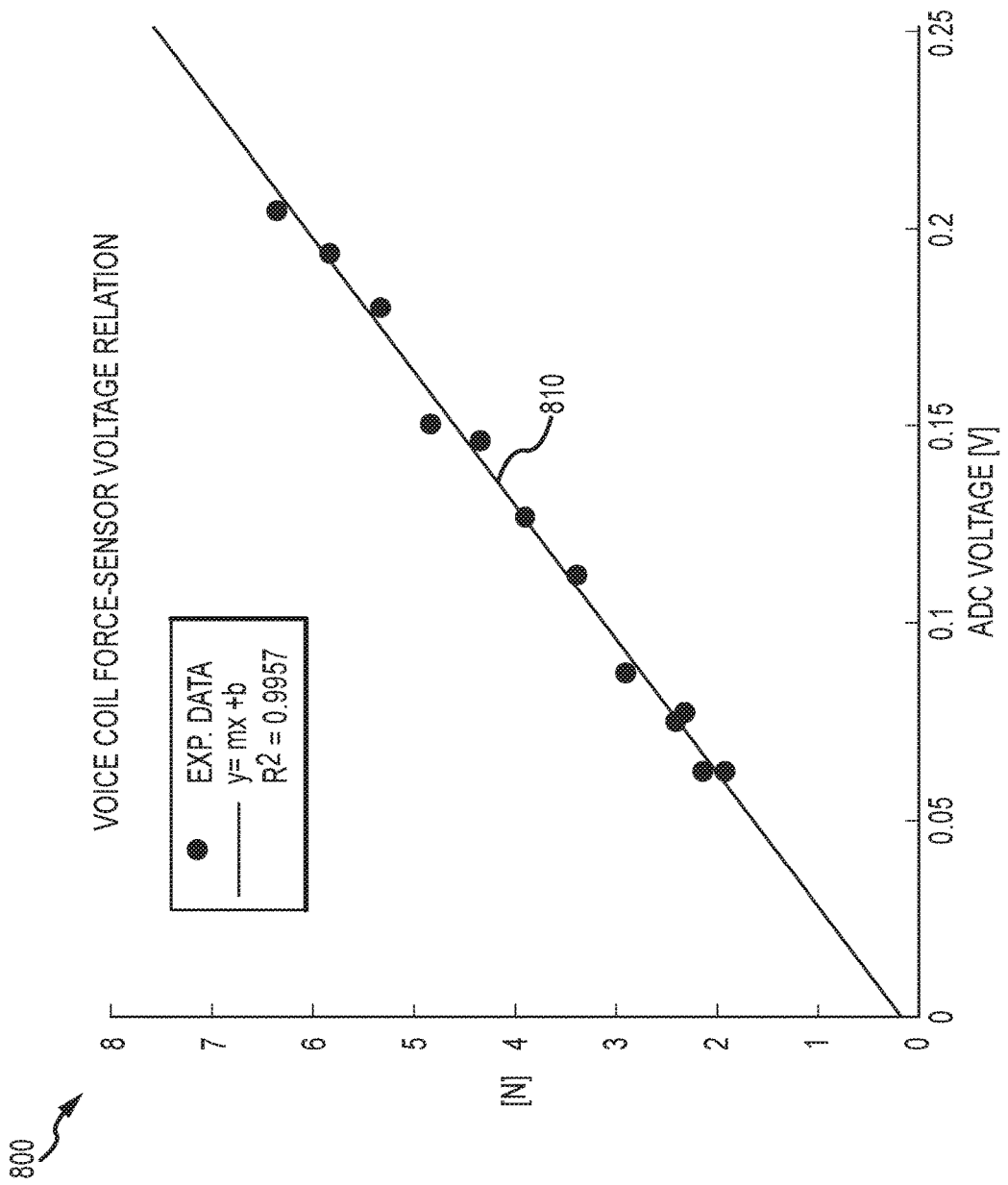
FIG. 8 is a graph showing the voice coil force and current sensor voltage relation (e.g., a linear relation between voice coil force and current sensor voltage)

With regard to force-current calibration, a first experiment was performed in which the hopping mechanism was inverted such that the foot pointed upward. The body housing was rigidly constrained to a workbench so as to allow the foot assembly to translate vertically with a single degree-of-freedom. The springs were removed, and weights of varying mass were added to the foot assembly to determine a force-current relationship for the voice coil provided in the hopping mechanism. A PID position controller was run to drive the voice coil to mid-stroke, where it was assumed the force constant is maximal. A known downward force was applied to the voice coil by accurately measuring the weight of the foot assembly and added mass with a scale. The added mass was varied for each trial, and the voltage of the current sensor was measured once the position reached steady state. A linear relation was found between sensor voltage and applied force (R2 =0.9957) as can be seen in the graph 800 and data results line 810 of FIG. 8. The line 810 shows a linear relation between voice coil force and sensor voltage, with slope and bias for the least-squares fit being m=29.5 and b=0.16, respectively. Since the current sensor voltage is proportional to measured current, the linear relation can be verified using Equation (1).

In a second experiment, the body housing of the hopping mechanism was horizontally constrained. The springs were removed in order to characterize the friction in the shaft-bearing pairs. A PID controller was used to drive the coil to mid-stroke and to apply zero voltage to the coil. Once the position reached the steady state, a ramp voltage was applied to the coil at approximately $$0.04 \frac{N}{s}.$$

The voice con force was recorded once the stroke deviated more than 0.6 millimeters from its steady-state position. Ten trials were recorded in either direction with results provided in Table II. The average breakaway force was found to be approximately 0.35 N. This value is much less than the average voice coil force during hopping operations of the hopping mechanism and should have negligible effects on performance.

TABLE II

Linear Bearing Breakaway Stiction Force (in Newtons)

| Measured force | Average | Measured force | Average |
|---|---|---|---|
| −0.3865 | −0.34 | 0.3138 | 0.35 |
| −0.3597 |  | 0.3341 |  |
| −0.3502 |  | 0.3596 |  |
| −0.3598 |  | 0.3569 |  |
| −0.3325 |  | 0.3546 |  |
| −0.3236 |  | 0.3599 |  |
| −0.3432 |  | 0.3720 |  |
| −0.3298 |  | 0.3563 |  |
| −0.3413 |  | 0.3633 |  |
| −0.3227 |  | 0.3636 |  |

Figure 9:
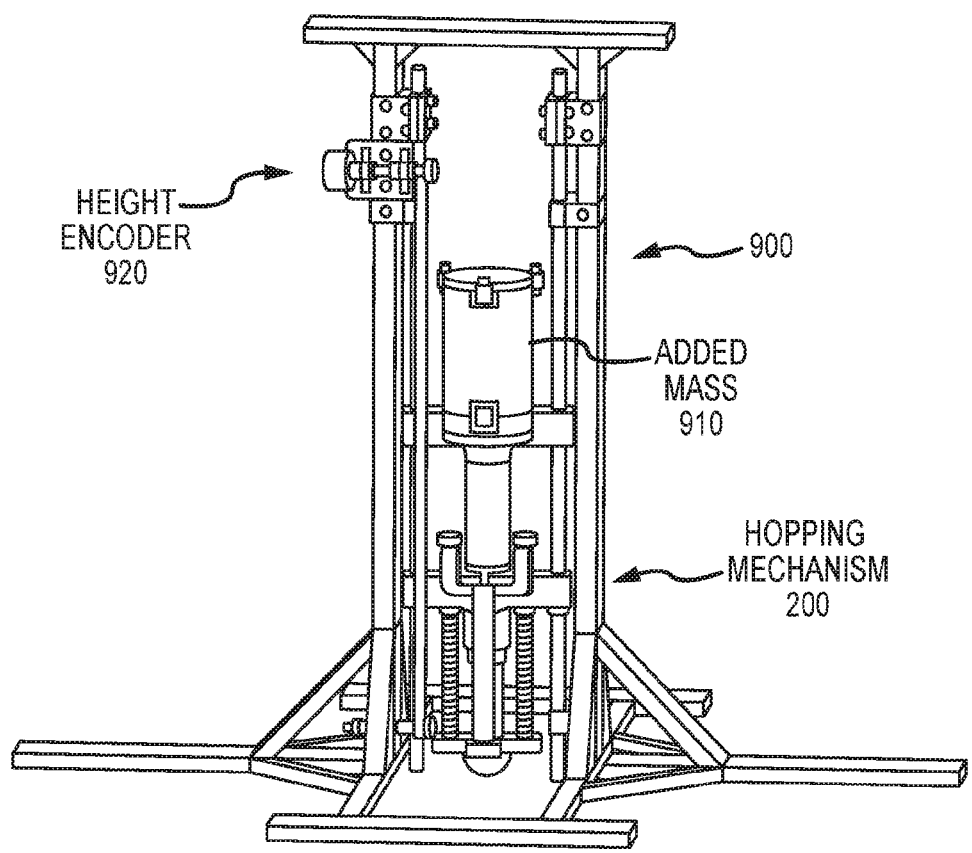
FIG. 9 illustrates an experimental setup for testing operations of a hopping mechanism (such as the hopper of FIG. 2)

In a third experiment with a setup shown in FIG. 9, the hopper 200 was placed on a vertical rail 900 with an encoder 920 to measure the height of the hopping mechanism 200, which is constrained to the vertical rail 900. Mass 910 was added as a load above the hopping mechanism 200 in measured quantities. As shown, the hopper 200 was placed on a vertical rail 900 to realize a two degree-of-freedom setup similar to that which was simulated. An incremental encoder 920 (e.g., 788 counts per meter before quadrature) was used to measure the height of the hopping mechanism 200 during the experimental operations of the VCM. Mass 910 was added to the torso (e.g., to the body housing of the mechanism 200) such as by placing measured quantities of steel BBs into a container that is rigidly attached to the torso and is also constrained to move along the vertical rail 900.

Figure 10:
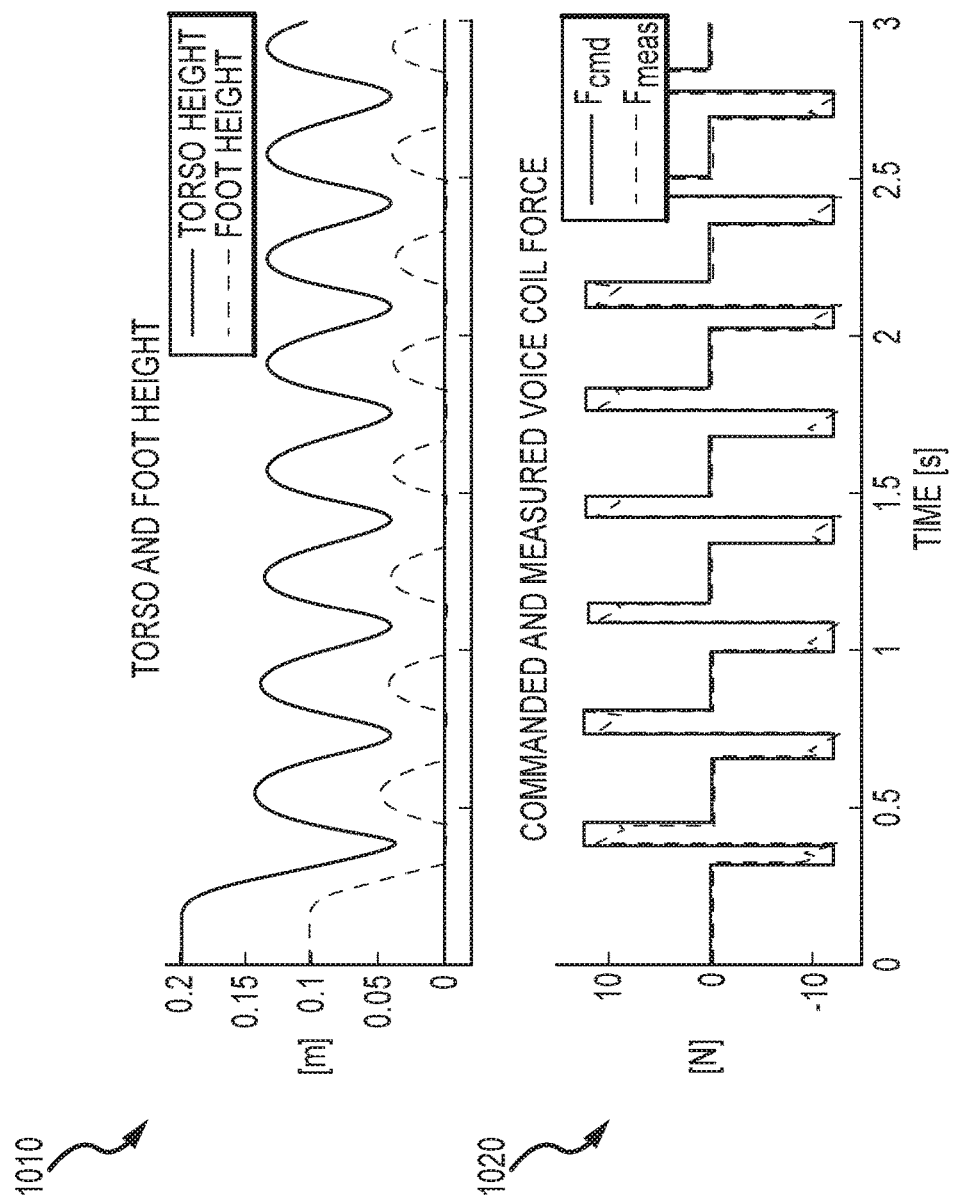
FIG. 10 provides graphs showing, respectively, torso and foot height plotted against time and commanded and measured voice coil force plotted against time.

In the experiment, the compression springs of various stiffness were installed around one or both shafts, e.g., the hopping mechanism may use one, two, or more springs to provide a spring element acting in parallel to the VCM. The hopping controller was run with similar initial conditions as in the simulation (e.g., approximately 0.1 meters in foot height). Five trials were run for each spring stiffness, and, during the trial, results were recorded including time (t), torso height ($q_1$), stroke ($q_2$), commanded voltage (V), and current sensor voltage ($V_i$). The collected data or results of one such trial are shown with the graphs 1010 and 1020 of FIG. 10. FIG. 10, specifically, provides selected hopping data collected for a spring stiffness of 771 N/m, with graph 1010 showing the torso ($q_1$) and foot height ($q_1-q_2$) plotted against time and with graph 1020 showing commanded and measured voice coil force plotted against time.

Figure 11:
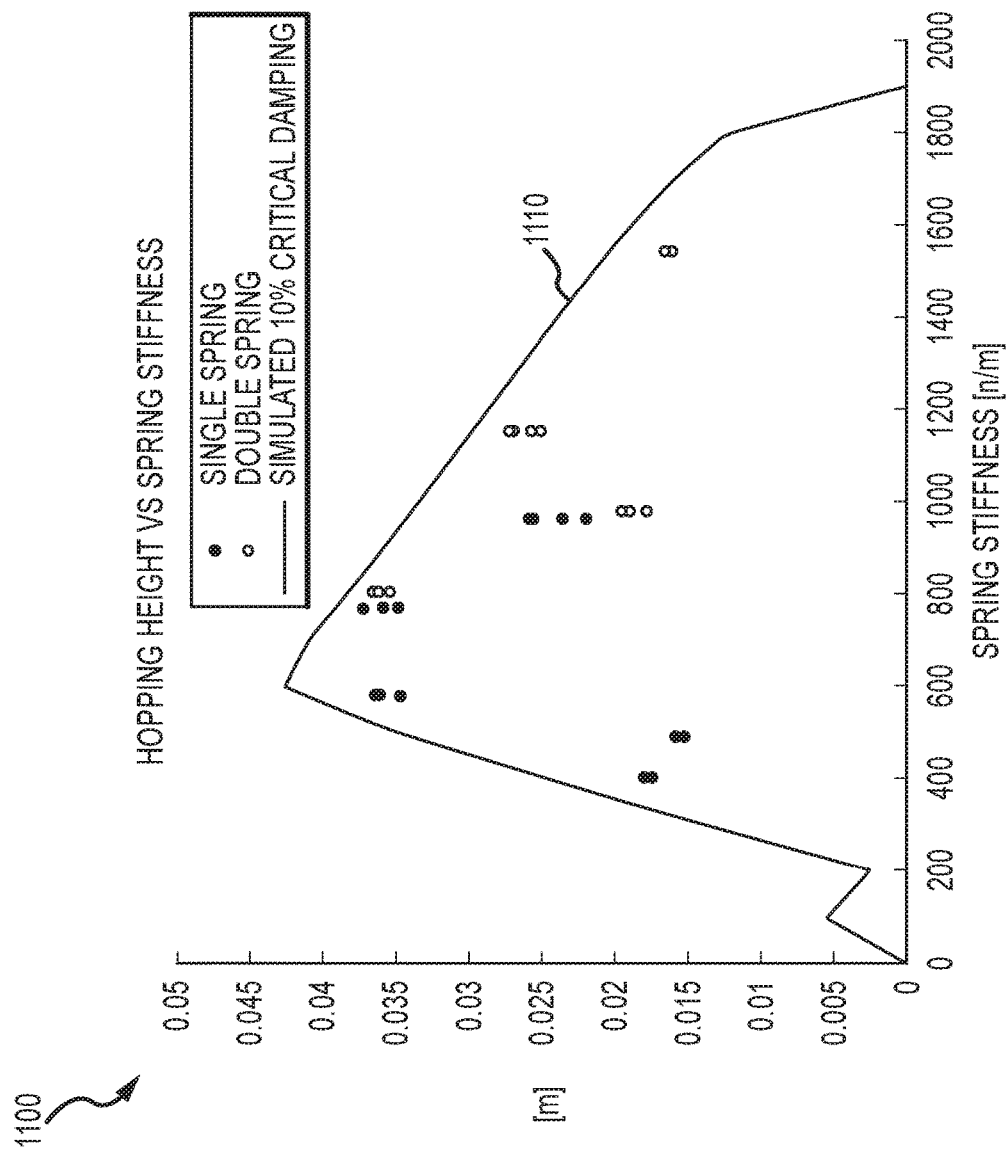
FIG. 11 illustrates a graph plotting hopping height versus spring stiffness for single and double spring configurations of the hopping mechanism as well as results of a simulation with 10% critical damping.

For each trial, the average hopping height of the foot was recorded. These values were then plotted against spring stiffness (as reported by the manufacturer of the springs). These plotted results can be seen in the graph 1100 of FIG. 11 with symbols representing single spring and double spring configurations. Line 1110 shows simulated results with 10 percent critical damping.

As will be readily appreciated by one skilled in these arts, the experimental data that was collected along with the design discussions can be used to design a controller that can precisely and quickly servo voice coil force, along with net force of the voice coil and spring. This is especially the case for applications other than hopping where maximal force output is not always desired/required. For example, a linear controller can be designed using measured current as an input, commanded voltage as an output, and Equations (1) to (4) as plant equations. A feedforward term can be used to augment the linear controller to compensate for the breakaway stiction of the bearings and might improve performance for trajectories where stroke velocity frequently changes sign. Finally, this force can be added to the estimate force of the spring, which can be found by multiplying spring displacement with spring stiffness, as reported by the spring manufacturer or measured by the user.

The experiments provided time series data for hopping that is qualitatively similar to the same data collected in simulation. When plotted against spring stiffness, average hopping height for the physical hopping mechanism shows (see FIG. 11) a pattern that is similar to the simulated system with 10 percent critical damping. Both data peak at similar spring stiffness (or range of stiffnesses) approximately 600 N/m (or 500 to 700 N/m) and exhibit a similar asymmetric slope to either side of the peak.

It is believed that experimental deviations from the simulated results are most likely affected by or the result of two causes. First, in simulation, friction was not modeled at the $q_i$ joint between the torso and world frames, which is present in the experiment due to the linear bearings used to realize the $q_1$ prismatic joint. Thus, even if the hopping mechanism (e.g., $q_2$ internal dynamics) was modeled perfectly, the simulation may still overestimate hopping height because it is free from external friction on the torso. Second, the compression springs that were used in the prototype have varied material properties, rest lengths, wire diameters, and inner diameters. The inner diameter affects frictional characteristics of the hopping mechanism as the spring may make contact with the outer surfaces of a guide shaft. Due to this and other variations, friction is likely inconsistent across springs, not as accurately modeled by a parallel spring dashpot, and not proportional to spring stiffness. A more accurate model may be utilized in simulations such as one that includes Coulomb friction.

Although the invention has been described and illustrated with a certain degree of particularity, the implementations described in the present disclosure have been presented as non-limiting examples, and numerous changes in the combination and arrangement of parts can be resorted to by those skilled in the art without departing from the spirit and scope of the invention, as claimed.

Implementations of a hopping mechanism with a linear actuator (such as a LEAP) were discussed for use in hopping robots, but it should be understood that concepts described herein have other uses in addition to legged robots. For example, the linear actuator design may be used as a general purpose weight-bearing actuator. In another example, the actuators for haptic devices may use a linear actuator (such as a LEAP) because the linear actuator design described has high control bandwidth, low inertia, and passive compliance. As a final example, a rotational embodiment of the LEAP mechanism can be implemented using rotationally analogous components (e.g., a rotational voice coil, torsion springs, rotary bearings, and so on). Such an embodiment can still be used as a general purpose load-bearing actuator and maintains all the same benefits described herein.

In this description, a novel hopping mechanism was proposed that places a voice coil in parallel with an elastic element (e.g., one or more springs). The inventors designed this hopping mechanism to include a linear elastic actuator in parallel (or "LEAP") or a parallel elastic mechanism. The electromechanical system was modeled with a range of spring stiffness and damping parameters. The description also discussed a hopping behavior that was demonstrated in simulation using a bang-bang controller. Further, the description explained that the inventors' built a physical prototype of the hopping mechanism that used embedded power and electronics. The inventors' work identified a linear force-current relationship, identified breakaway stiction in the linear bearings used in the prototype hopping mechanism, demonstrated hopping along a constrained axis, and showed that the experimental results roughly matched simulated results.

The LEAP or parallel elastic mechanism has been shown to have many desirable qualities that make it well suited for numerous applications including inclusion in a robot leg. Particularly, the hopping mechanism is suitable for providing dynamic, high velocity, and high force motions such as hopping or even running. The LEAP or parallel elastic mechanism has proven effective through prototyping to provide hopping at a maximum steady state of 3.5 centimeters ground clearance, which in the prototype provided a hop of about 20 percent leg length. With these results in mind, the LEAP or a hopping mechanism with the LEAP may serve the weight-bearing functions of a robot leg.

In some cases, such as when balance or other operations are maintained for a long period of time, overheating may become an issue for use of a parallel elastic mechanism. For example, the voice coil actuator may be overheated if controller commands (e.g., from a bang-bang controller) are continued indefinitely. Several design modifications or component additions may be used to provide cooling or avoid overheating. In a first embodiment, for example, the coil may be actively cooled. In a second embodiment, a thrust controller that is more efficient than the bang-bang approach may be used (as use of active cooling is accompanied with more power consumption and would add mass to the hopping or rotating mechanism).

We claim:

1. An apparatus for producing relative motion between a supported load and its environment, comprising:
    a direct drive motor directly coupled to the supported load and the environment operable to provide translational motion between the support load and the environment;
    an elastic element directly coupled to the supported load and the environment; and
    a prismatic guide assembly first supporting the direct drive motor to constrain the translational motion and second supporting the elastic element to constrain compression and expansion of the elastic element to be parallel to the translational motion,
    wherein the direct drive motor comprises a translational voice coil motor,
    wherein the prismatic guide assembly comprises:
        a coil support supporting a coil element of the voice coil motor;
        a body support spaced apart from the coil support and supporting a body of the voice coil motor; and
        a translational bearing assembly constraining relative movement between the coil and body supports to be parallel to the drive axis,
    wherein the translational bearing assembly comprises first and second guide shafts extending between the coil support and the body support and positioned on opposite sides of the voice coil motor,
    wherein the elastic element comprises a compression spring coiled about exterior surfaces of one of the first and second guide shafts, and
    wherein the elastic element further comprises an additional compression spring coiled about exterior surfaces of another one of the first and second guide shafts.

2. The apparatus of claim 1, further comprising a controller first controlling the direct drive motor to apply a first force to the elastic element and second controlling the direct drive motor to apply a second force opposite the first force to the elastic element to provide the translational motion.

3. The apparatus of claim 1, wherein the translation motion is constrained to be along a drive axis and wherein the prismatic guide assembly supports the spring element to constrain compression and expansion along a longitudinal axis that is parallel to and offset from the drive axis of the direct drive.

4. The apparatus of claim 3, further comprising a controller first controlling the direct drive motor to compress the spring element during a first time period beginning when the apparatus is sensed to initially contact a surface and second controlling the direct drive motor to expand the spring element during a second time period beginning when the apparatus is sensed to have zero velocity while contacting the surface.

5. The apparatus of claim 1, wherein the prismatic guide assembly further comprises first and second translational bearings in one of the body support and the coil support for receiving portions of the first and second guide shafts, respectively, during relevant movement of the body and coil supports cause by the translational motion of the voice coil motor.

6. The apparatus of claim 1, wherein the direct drive motor includes a cooling element that actively cools the voice coil motor.

7. The apparatus of claim 1, wherein relative motion between the supported load and the environment is rotational motion and wherein the direct drive motor comprises a rotational voice coil operable to provide the rotational motion.

8. An actuator mechanism, comprising:
    a voice coil comprising a coil and a body with an iron core and a space about the iron core for receiving the coil;
    a body support supporting the body of the voice coil;
    a coil support supporting the coil of the voice coil;
    a shaft extending between the coil support and body support;
    a translational bearing in the body support for slidingly engaging an end of the shaft;
    an elastic element coupled to the body and coil supports; and
    a controller first operating the voice coil to compress the elastic element during a first time period beginning when the actuator mechanism initially contacts a surface and second operating the voice coil to expand the elastic element during a second time period beginning when the actuator mechanism is sensed to have zero velocity while contacting the surface,
    wherein the first operating comprises applying a maximum voltage to the coil and
    wherein the second operating comprises applying a minimum voltage to the coil.

9. The actuator mechanism of claim 8, wherein, during operation of the voice coil, the coil and the body move relatively to each other with coinciding longitudinal axes and without contacting each other when supported by the body and coil supports.

10. The actuator mechanism of claim 8, wherein the controller is operable for first operating the voice coil to apply a first force on the elastic element and second operating the voice coil to apply a second force opposite the first force to the elastic element to move the body support along the shaft.

11. The actuator mechanism of claim 8, wherein the controller third operates the voice coil when the actuator mechanism is spaced apart from the surface by applying zero voltage to the coil.

12. An apparatus for imparting a hopping motion to a supported load, comprising:
- a voice coil operable to provide translational motion;
- an elastic element;
- a prismatic guide assembly first supporting the voice coil to constrain the translational motion to be along a drive axis and second supporting the elastic element to constrain compression and expansion of the spring element along a longitudinal axis that is parallel to the drive axis of the voice coil; and
- a controller first controlling the voice coil to compress the elastic element during a first time period beginning when the apparatus is sensed to initially contact a surface and second controlling the voice coil to expand the elastic element during a second time period beginning when the apparatus is sensed to have zero velocity while contacting the surface,
- wherein the prismatic guide assembly comprises:
  - a coil support supporting a coil element of the voice coil;
  - a body support spaced apart from the coil support and supporting a body of the voice coil; and
  - a bearing assembly constraining relative movement between the coil and body supports to be parallel to the drive axis, and
- wherein the bearing assembly comprises first and second guide shafts extending between the coil support and the body support and positioned on opposite sides of the voice coil.

13. The apparatus of claim 12, wherein the elastic element comprises compression springs coiled about exterior surfaces of the first and second guide shafts.

14. The apparatus of claim 12, wherein the prismatic guide assembly further comprises first and second linear bearings in one of the body support and the coil support for receiving portions of the first and second guide shafts, respectively, during relevant movement of the body and coil supports cause by the translational motion of the voice coil.

15. An apparatus for producing relative motion between a supported load and its environment, comprising:
- a direct drive motor directly coupled to the supported load and the environment operable to provide translational motion between the support load and the environment;
- an elastic element directly coupled to the supported load and the environment; and
- a prismatic guide assembly first supporting the direct drive motor to constrain the translational motion and second supporting the elastic element to constrain compression and expansion of the elastic element to be parallel to the translational motion,
- wherein the direct drive motor comprises a translational voice coil motor, and
- wherein the direct drive motor includes a cooling element that actively cools the translational voice coil motor.

16. The apparatus of claim 15, further comprising a controller first controlling the direct drive motor to apply a first force to the elastic element and second controlling the direct drive motor to apply a second force opposite the first force to the elastic element to provide the translational motion.

17. The apparatus of claim 15, wherein the translation motion is constrained to be along a drive axis, wherein the elastic element comprises a spring element, and wherein the prismatic guide assembly supports the spring element to constrain compression and expansion along a longitudinal axis that is parallel to and offset from the drive axis of the direct drive.

18. The apparatus of claim 17, further comprising a controller first controlling the direct drive motor to compress the spring element during a first time period beginning when the apparatus is sensed to initially contact a surface and second controlling the direct drive motor to expand the spring element during a second time period beginning when the apparatus is sensed to have zero velocity while contacting the surface.

19. The apparatus of claim 15, wherein the prismatic guide assembly comprises:
- a coil support supporting a coil element of the translational voice coil motor;
- a body support spaced apart from the coil support and supporting a body of the translational voice coil motor; and
- a translational bearing assembly constraining relative movement between the coil and body supports to be parallel to the drive axis.

20. The apparatus of claim 19, wherein the translational bearing assembly comprises first and second guide shafts extending between the coil support and the body support and positioned on opposite sides of the translational voice coil motor.

21. The apparatus of claim 20, wherein the elastic element comprises a compression spring coiled about exterior surfaces of one of the first and second guide shafts.

22. The apparatus of claim 20, wherein the prismatic guide assembly further comprises first and second translational bearings in one of the body support and the coil support for receiving portions of the first and second guide shafts, respectively, during relevant movement of the body and coil supports cause by the translational motion of the voice coil motor.

23. The apparatus of claim 15, wherein relative motion between the supported load and the environment is rotational motion and wherein the direct drive motor comprises a rotational voice coil operable to provide the rotational motion.

24. The apparatus of claim 15, wherein the elastic element comprises at least one of a compression spring, an extension spring, and a compressed air cylinder.

* * * * *